United States Patent [19]

Agano

[11] Patent Number: 5,051,588

[45] Date of Patent: Sep. 24, 1991

[54] RADIATION IMAGE READ-OUT APPARATUS

[75] Inventor: Toshitaka Agano, Kanagawa, Japan

[73] Assignee: Fuji Photo Film Co., Ltd., Kanagawa, Japan

[21] Appl. No.: 612,362

[22] Filed: Nov. 14, 1990

[30] Foreign Application Priority Data

Nov. 14, 1989 [JP] Japan ................... 1-295625

[51] Int. Cl.$^5$ .......................................... G03B 42/02
[52] U.S. Cl. ............................................. 250/327.2
[58] Field of Search ........................ 250/327.2 A–L, 250/484.1

[56] References Cited

U.S. PATENT DOCUMENTS

| | | |
|---|---|---|
| 4,258,264 | 3/1981 | Kotera et al. |
| 4,276,473 | 6/1981 | Kato et al. |
| 4,315,318 | 2/1982 | Kato et al. |
| 4,320,296 | 3/1982 | Ishida et al. ........ 250/327.2 |
| 4,387,428 | 6/1983 | Ishida et al. |
| 4,498,006 | 2/1985 | Horikawa et al. ....... 250/327.2 |
| 4,864,134 | 9/1989 | Hosoi et al. |
| 4,885,467 | 12/1989 | Horikawa ............ 250/327.2 |
| 4,985,629 | 1/1991 | Horikawa ............ 250/327.2 |

FOREIGN PATENT DOCUMENTS 56-11395 2/1981 Japan.

Primary Examiner—Constantine Hannaher
Assistant Examiner—Edward J. Glick
Attorney, Agent, or Firm—Sughrue, Mion, Zinn, Macpeak & Seas

[57] ABSTRACT

In a radiation image read-out apparatus, a stimulable phosphor sheet, on which a radiation image has been stored, is exposed to stimulating rays, which cause the stimulable phosphor sheet to emit light in proportion to the amount of energy stored thereon during its exposure to radiation. The emitted light is photoelectrically detected and converted into an image signal representing the radiation image. An ultraviolet lamp is provided, which produces ultraviolet rays such that energy from the ultraviolet rays is approximately uniformly stored on a stimulate phosphor sheet. The image signal is corrected in accordance with information about the characteristics of shading. The information about the characteristics of shading is corrected in accordance with a signal detected from a stimulable phosphor sheet, on which the energy from the ultraviolet rays have been approximately uniformly stored.

6 Claims, 1 Drawing Sheet

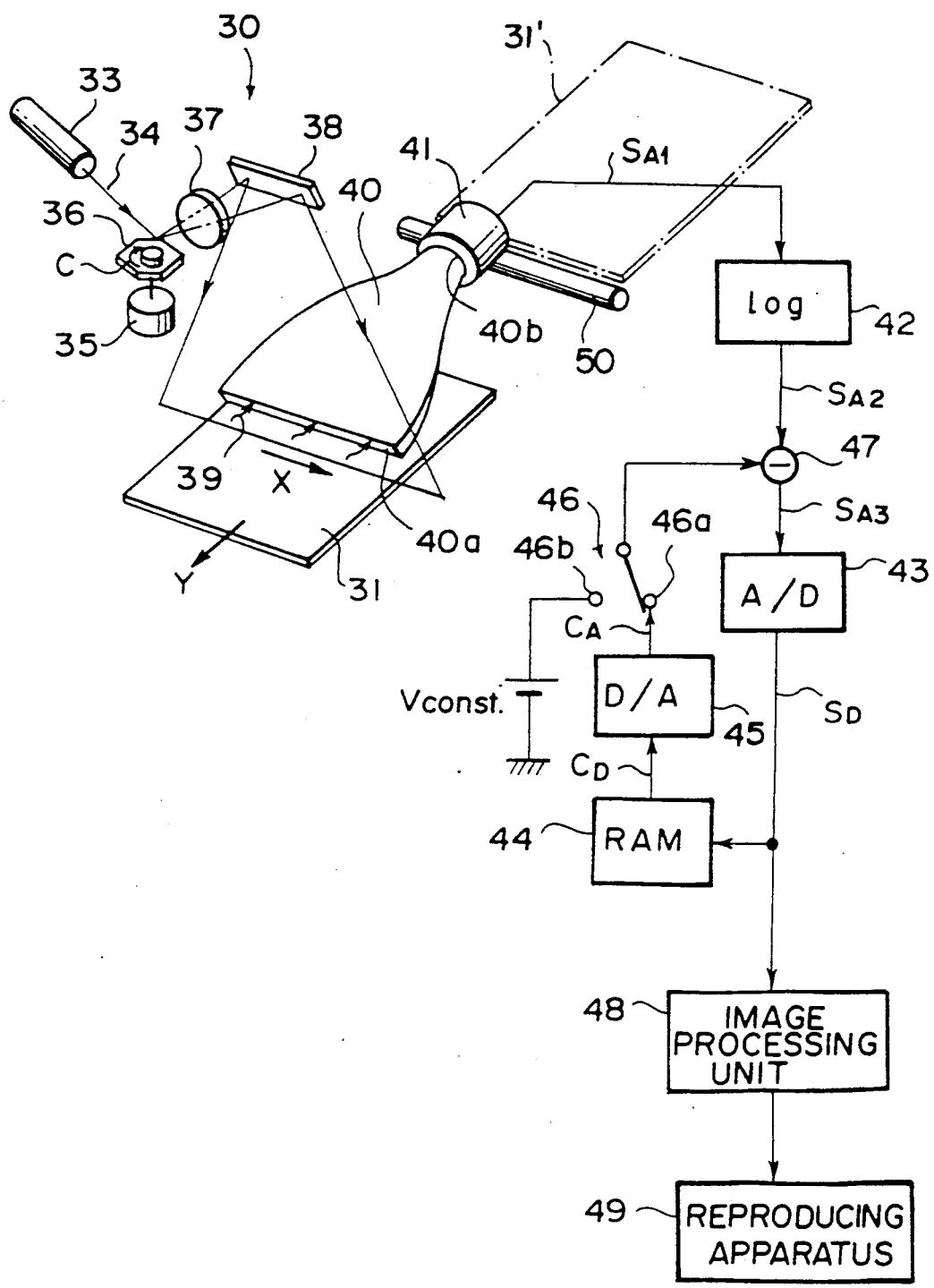

RADIATION IMAGE READ-OUT APPARATUS

BACKGROUND OF THE INVENTION

1. Field of the Invention

This invention relates to a radiation image read-out apparatus wherein a stimulable phosphor sheet, on which a radiation image has been stored, is exposed to stimulating rays, which cause the stimulable phosphor sheet to emit light in proportion to the amount of energy stored thereon during its exposure to radiation, and the emitted light is photoelectrically detected and converted into an image signal representing the radiation image.

2. Description of the Prior Art

When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In the radiation image recording and reproducing systems described above, a radiation image read-out apparatus is used in order to detect an image signal from a stimulable phosphor sheet, on which a radiation image has been stored. In the radiation image read-out apparatus, a stimulable phosphor sheet, on which a radiation image has been stored, is exposed to stimulating rays, which cause the stimulable phosphor sheet to emit light in proportion to the amount of energy stored thereon during its exposure to radiation, and the emitted light is photoelectrically detected and converted into an image signal representing the radiation image. It is necessary that the image signal obtained from the radiation image read-out apparatus accurately represents the radiation image, which was stored on the stimulable phosphor sheet.

By way of example, when radiation is uniformly irradiated to a stimulable phosphor sheet, the stimulable phosphor sheet is then exposed to stimulating rays, which cause it to emit light in proportion to the amount of energy stored thereon during its exposure to the radiation, and the emitted light is photoelectrically detected and converted into an image signal, the image signal should have uniform value. However, it often occurs that the value of the image signal thus detected is not uniform. The reasons why such a problem occurs will be described hereinbelow.

With a certain radiation image read-out apparatus, a stimulable phosphor sheet, on which a radiation image has been stored, is scanned with a light beam (stimulating rays) in a main scanning direction and a sub-scanning direction which is approximately normal to the main scanning direction. When each portion of the stimulable phosphor sheet is thus exposed to the light beam, the exposed portion emits light in proportion to the amount of energy stored thereon during its exposure to the radiation. The emitted light is detected and converted into an image signal by a photoelectric conversion means, which has a light receiving surface, positioned to extend along the main scanning line on the stimulable phosphor sheet. (By way of example, the photoelectric conversion means is constituted of a combination of a light guide member with a photomultiplier. The light guide member has a light receiving surface, positioned to extend along the main scanning line on the stimulable phosphor sheet, and a ring-shaped light output face. The photomultiplier receives the light emanating from the light output face of the light guide member. Alternatively, as disclosed in, for example, U.S. Pat. No. 4,864,134, the photoelectric conversion means may be constituted of a long photomultiplier, which has a long light receiving surface, positioned to extend along the main scanning line, and which is located close to the stimulable phosphor sheet.) In such a radiation image read-out apparatus, even if the amount of light, which is emitted by the stimulable phosphor sheet and which impinges upon the light receiving surface of the photoelectric conversion means, is the same, the sensitivity with which the photoelectric conversion means detects the light varies in accordance with the position, with respect to the main scanning direction, from which the light impinges upon the light receiving surface. The nonuniformity in the sensitivity, with which the photoelectric conversion means detects the light emitted by the stimulable phosphor sheet, is referred to as shading.

Also, by way of example, in cases where a rotating polygon mirror, which has a plurality of reflecting surfaces, is used to scan the light beam in the main scanning direction, problems with regard to surface inclination occur due to, primarily, the inclination of the rotation axis of the rotating polygon mirror. Specifically, even if the light beam impinges upon the rotating polygon mirror from the same direction, the directions along which the light beam is reflected by different reflecting surfaces of the rotating polygon mirror deviate in the sub-scanning direction. In such cases, the intervals, at which a plurality of scanning lines of the light beam are formed on the stimulable phosphor sheet, do not become uniform with respect to the sub-scanning direction. As a result, part of a scanning line (e.g. a 10µm-wide part of a scanning line formed with a light beam having a beam diameter of 100µm) overlaps the adjacent scanning line, or two adjacent scanning lines become spaced too far apart from each other. Therefore, when a visible image is reproduced from the image signal detected from the stimulable phosphor sheet, nonuniformity in the image density occurs in the sub-scanning direction with a period corresponding to one turn of the rotating polygon mirror.

In order for the shading, the nonuniformity in the image density, or the like, to be eliminated, a novel method has been proposed in, for example, U.S. Pat. Application Ser. No. 391,830, now U.S. Pat. No. 4,985,629. With the proposed method, a stimulable phosphor sheet is uniformly exposed to radiation in a radiation image recording apparatus. The stimulable phosphor sheet, which has been uniformly exposed to the radiation, is then exposed to a light beam, which causes the stimulable phosphor sheet to emit light in proportion to the amount of energy stored thereon during its exposure to the radiation, and the emitted light is photoelectrically detected. In this manner, the characteristics of the shading along the main scanning direction are detected with respect to the respective reflecting surfaces of the rotating polygon mirror. (The characteristics of the shading include not only the effects from the nonuniformity in the sensitivity, with which the photoelectric conversion means detects the light emitted by the stimulable phosphor sheet, but also the effects from the nonuniformity in the image density, differences in reflectivity among the reflecting surfaces of the rotating polygon mirror, or the like. All of these sources, from which the problems occur in that an image signal having uniform value cannot be obtained from a stimulable phosphor sheet when the stimulable phosphor sheet is exposed uniformly to radiation, will hereinbelow be referred to as the characteristics of the shading.) The information about the characteristics of the shading is stored in a storage means. When an image signal representing a radiation image is detected from a stimulable phosphor sheet, on which the radiation image has been stored, the image signal is corrected in accordance with the shading characteristics stored in the storage means.

However, it often occurs that, for example, the extent of the surface inclination of the rotating polygon mirror changes during the operation of the radiation image read-out apparatus. As a result, the shading characteristics change. Therefore, in order that image signals accurately representing radiation images may be obtained, it is necessary for operations to be carried out periodically wherein a stimulable phosphor sheet is uniformly exposed to radiation in a radiation image recording apparatus and an image signal is detected from the stimulable phosphor sheet, which has been uniformly exposed to the radiation, with the radiation image read-out apparatus. However, considerable time and labor are required to carry out such operations. Also, it is not easy to irradiate radiation uniformly to the stimulable phosphor sheet. It is possible for the manufacturer of the radiation image read-out apparatus to detect the shading characteristics by uniformly exposing the stimulable phosphor sheet to radiation in a radiation image recording apparatus in the course of assembling the radiation image read-out apparatus. However, from the point of view of the required time and labor and the accuracy with which the shading characteristics are detected, it is difficult to have the user of the radiation image read-out apparatus periodically detect the shading characteristics.

SUMMARY OF THE INVENTION

The primary object of the present invention is to provide a radiation image read-out apparatus provided with a means, with which the characteristics of shading are corrected easily and accurately.

Another object of the present invention is to provide a radiation image read-out apparatus which enables accurate detection of a radiation image.

The present invention provides a radiation image read-out apparatus wherein a stimulable phosphor sheet, on which a radiation image has been stored, is exposed to stimulating rays, which cause the stimulable phosphor sheet to emit light in proportion to the amount of energy stored thereon during its exposure to radiation, and the emitted light is photoelectrically detected and converted into an image signal representing the radiation image, wherein the improvement comprises the provision of an ultraviolet lamp, which produces ultraviolet rays such that energy from the ultraviolet rays is approximately uniformly stored on a stimulable phosphor sheet.

When a stimulable phosphor sheet is exposed to ultraviolet rays, energy from the ultraviolet rays is stored on the stimulable phosphor sheet.

The radiation image read-out apparatus in accordance with the present invention is provided with an ultraviolet lamp, which produces ultraviolet rays such that energy from the ultraviolet rays is approximately uniformly stored on a stimulable phosphor sheet. Therefore, with the radiation image read-out apparatus in accordance with the present invention, operations need not be carried out wherein a stimulable phosphor sheet is uniformly exposed to radiation in a radiation image recording apparatus. Also, in the course of assembling the radiation image read-out apparatus, the manufacturer of the radiation image read-out apparatus can adjust how uniform a stimulable phosphor sheet is exposed to the ultraviolet rays. Accordingly, the radiation image read-out apparatus in accordance with the present invention enables the user to correct the shading characteristics easily and accurately.

BRIEF DESCRIPTION OF THE DRAWING

The single drawing is a schematic view showing an embodiment of the radiation image read-out apparatus in accordance with the present invention, which is constituted as an X-ray image read-out apparatus.

DESCRIPTION OF THE PREFERRED EMBODIMENT

The present invention will hereinbelow be described in further detail with reference to the accompanying drawing.

In an X-ray image recording apparatus (not shown), a stimulable phosphor sheet 31 is exposed to X-rays, which have passed through an object. An X-ray image of the object is thereby stored on the stimulable phosphor sheet 31. The stimulable phosphor sheet 31, on which the X-ray image has been stored, is then set at a predetermined position in a radiation image read-out apparatus 30.

The stimulable phosphor sheet 31, which has been set at the predetermined position (the position indicated by the chained line 31'), is then conveyed in a sub-scanning direction indicated by the arrow Y by a conveyance means (not shown). A laser beam 34, which serves as stimulating rays, is produced by a laser beam source 33, and is reflected and deflected by a rotating polygon mirror 36 which is quickly rotated by a motor 35 in the direction indicated by the arrow C. The laser beam 34 then passes through an fθ lens 37. The direction of the optical path of the laser beam 34 is then changed by a mirror 38, and the laser beam 34 impinges upon the stimulable phosphor sheet 31 and scans it in a main scanning direction indicated by the arrow X, which direction is approximately normal to the sub-scanning direction indicated by the arrow Y. When the stimulable phosphor sheet 31 is exposed to the laser beam 34, the exposed portion of the stimulable phosphor sheet 31 emits light 39 in an amount proportional to the amount of energy stored thereon during its exposure to the X-rays. The emitted light 39 is guided by a light guide member 40 and photoelectrically detected by a photomultiplier 41. The light guide member 40 is made from a light guiding material such as an acrylic plate and has a linear light input face 40a, positioned so that it extends along the main scanning line on the stimulable phosphor sheet 31, and a ring-shaped light output face 40b, positioned so that it is in close contact with a light receiving face of the photomultiplier 41. The emitted light 39, which has entered the light guide member 40 at its light input face 40a, is guided through repeated total reflection inside of the light guide member 40, emanates from the light output face 40b, and is received by the photomultiplier 41. In this manner, the amount of the emitted light 39, which amount represents the X-ray image, is converted into an electric signal by the photomultiplier 41.

An analog image signal SA1 generated by the photomultiplier 41 is logarithmically amplified by a logarithmic amplifier 42 into an image signal SA2. A RAM 44 stores information about the shading characteristics CD, which have been detected in advance. The information about the shading characteristics CD is fed into a D/A converter 45 and is converted thereby into an analog shading characteristics signal CA. The shading characteristics signal CA is fed into a subtracter 47 through a switch 46, which is set to the side of a contact 46a. The subtracter 47 subtracts the shading characteristics signal CA from the image signal SA2 in order to compensate for the shading characteristics. In this manner, an image signal SA3 is obtained from the compensation for the shading characteristics. The image signal SA3 is fed into an A/D converter 43, which samples the image signal SA3 and converts it into a digital image signal SD. The image signal SD is fed into an image processing unit 48, which carries out appropriate image processing on the image signal SD. After being processed, the image signal SD is fed into an image reproducing apparatus 49, which reproduces a visible image from the image signal SD.

How the information about the shading characteristics CD is corrected will be described hereinbelow. The shading characteristics change due to, for example, a change in the radiation image read-out apparatus with the passage of time (e.g. when the inclination of the rotation axis of the rotating polygon mirror 36 changes during the operation of the radiation image read-out apparatus).

An ultraviolet lamp 50 is located above the conveyance path of a stimulable phosphor sheet 31 on the side upstream from the scanning line of the laser beam 34. The ultraviolet lamp 50 extends in the direction of the width of the stimulable phosphor sheet 31. The ultraviolet lamp 50 is turned on, and the stimulable phosphor sheet 31, which has been set at the predetermined position 31', is conveyed in the direction indicated by the arrow Y. In this manner, the whole surface of the stimulable phosphor sheet 31 is uniformly exposed to the ultraviolet rays produced by the ultraviolet lamp 50. As a result, energy from the ultraviolet rays is uniformly stored on the whole surface of the stimulable phosphor sheet 31.

The stimulable phosphor sheet 31, on which the energy has been stored uniformly over the whole surface, is scanned with the laser beam 34 in two directions and the light 39 emitted by the stimulable phosphor sheet 31 is detected in the same manner as that during the operation for reading out the X-ray image. At this time, the switch 46 is set to the side of a contact 46b, and a constant voltage, Vconst., is fed into the subtracter 47. In this manner, a signal SD representing the amount of the light 39 is obtained. The signal SD is fed into the RAM 44, and the information about the shading characteristics CD stored in the RAM 44 is corrected with the signal SD.

I claim:

1. A radiation image read-out apparatus wherein a stimulable phosphor sheet, on which a radiation image has been stored, is exposed to stimulating rays, which cause the stimulable phosphor sheet to emit light in proportion to the amount of energy stored thereon during its exposure to radiation, and the emitted light is photoelectrically detected and converted into an image signal representing the radiation image, wherein the improvement comprises the provision of an ultraviolet lamp, which produces ultraviolet rays such that energy from the ultraviolet rays is approximately uniformly stored on the entire surface of a stimulable phosphor sheet.

2. An apparatus as defined in claim 1 further comprising means for storing information about shading characteristics, and means for correcting said image signal in accordance with the information about the shading characteristics.

3. An apparatus as defined in claim 1 further comprising means for correcting information about shading characteristics in accordance with a signal detected from a stimulable phosphor sheet, on which the energy from the ultraviolet rays provided by said ultraviolet lamp has been approximately uniformly stored.

4. A radiation image read-out apparatus for detecting light emitted from a stimulable phosphor sheet having radiation stored thereon, said apparatus comprising:

means for scanning the stimulable phosphor sheet with stimulating rays to detect emitted light;

conversion means for converting the emitted light into an image signal;

storage means for storing shading information;

correction means for correcting the image signal in accordance with the shading information;

irradiation means for uniformly providing storable radiation on the entire surface of the stimulable phosphor sheet; and update means for updating the shading information stored in said storage means in accordance with the image signal produced by the stimulable phosphor sheet when the radiation stored thereon is uniformly provided by said irradiation means.

5. An apparatus as defined in claim 4, wherein said apparatus operates in one of a normal mode and an update mode, in the update mode said irradiation means provides uniform radiation to the stimulable phosphor sheet, and wherein said apparatus further comprises:
a constant voltage source; and
switch means having a first position selecting the normal mode and a second position selecting the update mode.

6. An apparatus as defined in claim 5, wherein the first position of said switch means operatively connects said storage means to said correction means for supplying the shading information and the second position of said switch means operatively connects said constant voltage source to said correction means for creating shading information during the update mode.

* * * * *